United States Patent
Mitchell et al.

(10) Patent No.: US 10,739,055 B2
(45) Date of Patent: Aug. 11, 2020

(54) COLD ROOM COMBINATION VENT AND LIGHT

(71) Applicant: Kason Industries, Inc., Newnan, GA (US)

(72) Inventors: Brett A. Mitchell, Newnan, GA (US); Raymond J. Hiller, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 0 days.

(21) Appl. No.: 16/398,893

(22) Filed: Apr. 30, 2019

(65) Prior Publication Data

US 2020/0003475 A1    Jan. 2, 2020

Related U.S. Application Data

(63) Continuation-in-part of application No. 16/022,953, filed on Jun. 29, 2018.

(51) Int. Cl.

| | |
|---|---|
| *F16K 17/12* | (2006.01) |
| *F25D 13/06* | (2006.01) |
| *F25D 17/04* | (2006.01) |
| *F25D 27/00* | (2006.01) |
| *F21V 29/83* | (2015.01) |
| *F21V 29/70* | (2015.01) |
| *F21V 31/03* | (2006.01) |

(52) U.S. Cl.
CPC ............ *F25D 13/067* (2013.01); *F16K 17/12* (2013.01); *F21V 29/70* (2015.01); *F21V 29/83* (2015.01); *F21V 31/03* (2013.01); *F25D 17/047* (2013.01); *F25D 27/005* (2013.01)

(58) Field of Classification Search
CPC .......... F21V 29/83; F21V 29/70; F21V 31/03; F25D 17/042
See application file for complete search history.

(56) References Cited

U.S. PATENT DOCUMENTS

| | | |
|---|---|---|
| 2,436,183 A | 2/1948 | Snedecor |
| 2,991,708 A | 7/1961 | Falk et al. |
| 3,952,542 A | 4/1976 | Berkowitz |
| 4,613,930 A | 9/1986 | Ambasz |
| 4,662,270 A | 5/1987 | Fiddler et al. |
| 4,796,163 A * | 1/1989 | Dressler .................. F21S 45/33 362/547 |
| 4,817,506 A | 4/1989 | Cashman |
| 5,421,775 A | 6/1995 | Honda |
| 5,722,181 A | 3/1998 | Meyer |

(Continued)

*Primary Examiner* — Alexander K Garlen
*Assistant Examiner* — Eric T Eide
(74) *Attorney, Agent, or Firm* — Baker Donelson

(57) ABSTRACT

A combination light and pressure relief vent (10) is disclosed which includes a housing (11), a valve assembly (12), and a light assembly (13). The housing include a valve body (16), port tube (17), and an outside louver (18). The valve assembly includes a low positive pressure exhaust valve (57), a high positive pressure exhaust valve (59), a low negative pressure intake valve (61), and a high negative pressure intake valve (62). The light assembly includes a heat sink casing (68) which defines a heat chamber (37) and which includes a projection (80) extending into the heat chamber. The casing is coupled to an LED module (57) wherein heat generated by the LED module is transferred through the casing to the heat chamber to warm the valve assembly.

16 Claims, 5 Drawing Sheets

(56) References Cited

U.S. PATENT DOCUMENTS

| | | | |
|---|---|---|---|
| 5,800,261 A | 9/1998 | Volstad | |
| 6,176,776 B1 | 1/2001 | Finkelstein et al. | |
| 6,817,942 B1 | 11/2004 | Betz | |
| 6,875,102 B2 | 4/2005 | Achen | |
| 6,932,694 B2 | 8/2005 | Jeffries | |
| 7,127,855 B1 | 10/2006 | Garvey | |
| 7,651,390 B1 | 1/2010 | Profeta et al. | |
| 7,774,999 B2 | 8/2010 | McKee et al. | |
| 8,574,045 B2 | 11/2013 | Warner | |
| 8,651,704 B1* | 2/2014 | Gordin | G16C 20/40 362/294 |
| 8,925,262 B2 | 1/2015 | Railkar et al. | |
| 8,991,111 B1 | 3/2015 | Harkins | |
| 8,992,293 B1 | 3/2015 | Finkelstein | |
| 2008/0188173 A1 | 8/2008 | Chen | |
| 2011/0189938 A1 | 8/2011 | Yoshii et al. | |
| 2012/0003917 A1 | 1/2012 | Jeong | |
| 2013/0062437 A1* | 3/2013 | Hanna | B05B 1/18 239/289 |
| 2013/0223083 A1* | 8/2013 | Kimiya | F21V 23/006 362/382 |
| 2016/0046164 A1 | 2/2016 | Yamamotoya | |
| 2017/0184288 A1* | 6/2017 | Owens | F21V 29/74 |
| 2019/0031266 A1* | 1/2019 | Tsuchiya | F21V 29/83 |
| 2019/0041023 A1* | 2/2019 | Ono | B60Q 1/302 |
| 2019/0271449 A1* | 9/2019 | Helwig | F21V 29/74 |

* cited by examiner

COLD ROOM COMBINATION VENT AND LIGHT

REFERENCE TO RELATED APPLICATION

This is a continuation-in-part application of U.S. patent application Ser. No. 16/022,953 filed Jun. 29, 2018 and entitled "COLD ROOM COMBINATION VENT AND LIGHT".

TECHNICAL FIELD

This invention relates to pressure relief vents used on temperature controlled enclosures such as walk-in freezers and refrigerators.

BACKGROUND OF THE INVENTION

Many temperature controlled commercial enclosed spaces need to be equipped with pressure relief ports or vents which are sometimes referred to as ventilators or ventilator ports. This is particularly true where the sealed space is subjected to temperature related air volume variations that must be relieved, such as a cold room.

Cold rooms typically have a neutral air pressure. To achieve the neutral air pressure the cold room is fitted with passive ports or vents. However existing passive pressure relief ports, meaning those without fans or blowers, have often permitted unwanted air migration where there is no significant pressure differential. With walk-in freezers this air intrusion may cause undesirable condensation and frosting. Frosting is a substantial problem that occurs when ambient warm air drawn into a low temperature chamber releases significant amounts of moisture relative to the change in dew point of the air at high and low temperatures. Air is drawn through the port after each door opening cycle wherein the warm air that entered the enclosure cools and contracts within the cold environment of the enclosure. If venting does not occur, a partial vacuum results within the enclosure which makes it difficult to reopen the door. In extreme cases, the enclosures can even collapse.

A temperature rise in the enclosure between cooling cycles, and especially during a defrost cycle, creates a need to vent air to the exterior to prevent pressure buildup. Again, failure to vent this pressure, with adequate relief capacity, can cause the chamber to rupture.

Passive pressure relief ports are in wide commercial use today. Large structures require the movement of a large amount of air to equalize the pressure between the interior and the exterior of the enclosure. Existing commercial use vents can be either a large sized vent or a gang of small sized vents. This large amount of air movement carries with it a large amount of moisture. This moisture can condense almost immediately upon contact with the cold air and cold surfaces of the enclosure. If this occurs, a large ice block may form on the interior wall, which may eventually block the inflow of air through the port. This large ice block may also pose a potential danger to someone should it fall from the wall and strike the person. Also, the use of large vents within small rooms causes a low velocity flow of air to enter the room. This low velocity air flow is more susceptible to freezing the moisture within the airflow upon entering the cold room.

Another problem with cold rooms is that high negative pressure may be dangerous as the warm air entering the cold room enters the cold room with the entrance of a person. The entering warm air subsequently cools and creates a negative pressure within the cold room as it condenses. This negative pressure may hold the door in a closed position until the pressure within the room normalizes. A person within the cold room may become panicked when unable to open the door. Today's vents alleviate small amounts of incoming warm air, but are inadequate to deal quickly with large volumes of warm air associated with multiple door entries or large sliding doors.

Another problem is the icing of certain valves associated with vents of cold rooms. Moisture entering the cold room may condense as ice upon the valves, thereby preventing them from functioning properly. One solution to this problem has been to simply chip the ice off the valve or remove it with the use of a heat gun. These solutions are time consuming and inadequate as it may damage the vent, cause bodily injury, and be only effective once the problem is discovered. As such, some vents have included resistive heaters. However, should the heater fail, the problem will go unresolved until the vent heater is repaired.

Yet another problem with some static valves has been that they operate and are adjusted to open at a select pressure gravitationally by adjusting the weight of a movable valve portion (poppet valve), i.e., the valves are gravitationally set and operated by their own weight, as shown in U.S. Pat. No. 6,176,776. However, large air movements, such as wind or even a door closing, may cause the valve to open or flutter. This fluttering of the valve may cause it to open unnecessarily when a need for ventilation does not truly exist. The opening may also cause the valve to remain open for more time than necessary, thereby creating an icing of the valve which increases over time due to the valve remaining in an open condition.

The adjusting of the pressure by having different sized weights also increases costs associated with the vent. The different sizing of components increases the amount of inventory a supplier must carry, increase the number of components required to assemble the vent, and creates a potential for mistakenly utilizing the wrong component.

Lastly, a problem with these gravity valve devices has been that they are designed to operate in only one orientation, as they are mounted to operate with the valve positioned vertically. As such, an installer may need to inventory different models for different orientations of the valve housing based on its mounted orientation, thereby increasing expenses for the installer.

Accordingly, it is seen that a need exists for a pressure release vent that prevents the formation of ice, which is easily mounted in different orientations, and which allows for different amounts of air flow. It thus is to be provision of such a vent that the present invention is primarily directed

SUMMARY OF THE INVENTION

In a preferred form of the invention a cold room vent comprises a main housing mountable to a cold room structure, a valve housing coupled to the main housing and defining an interior heat chamber, a valve assembly coupled to the valve housing, and a light assembly coupled to the valve housing. The light assembly has a thermally conductive heat sink plate with an external surface and an internal surface in fluid communication with the interior heat chamber. The internal surface has an outwardly extending projection extending into the interior heat chamber. The light assembly also includes a light source coupled to and in thermal communication with the exterior surface of the thermally conductive heat sink plate. With this construction, the heat generated by the light source is thermally conducted to the thermally conductive heat sink plate wherein the projection provides a surface area to transfer the heat to the interior heat chamber to warm the valve assembly.

DETAILED DESCRIPTION

Figure 1:
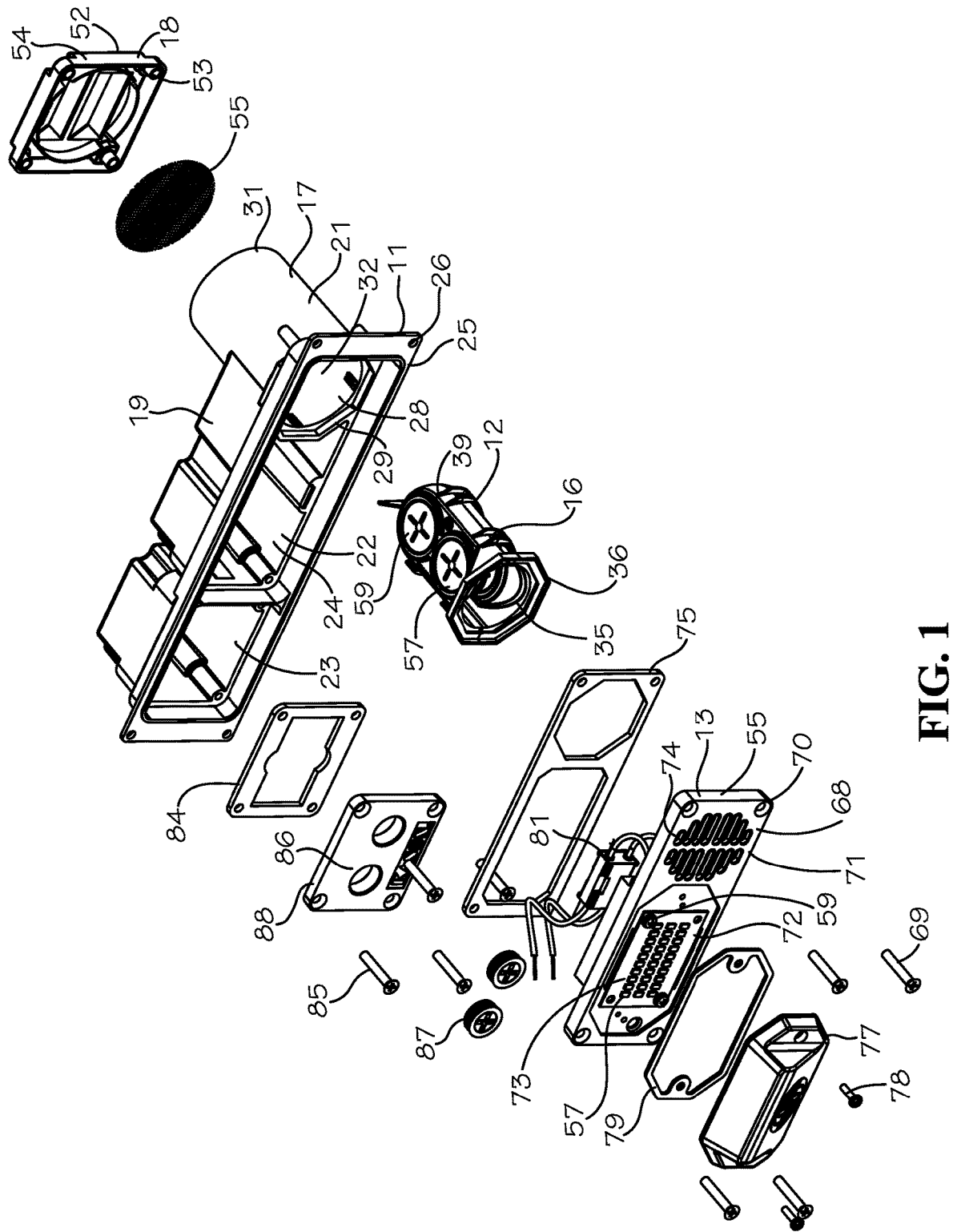
FIG. 1 is an exploded, perspective view of a cold room vent and light that embodies principles of the invention in its preferred form.
Figure 2:
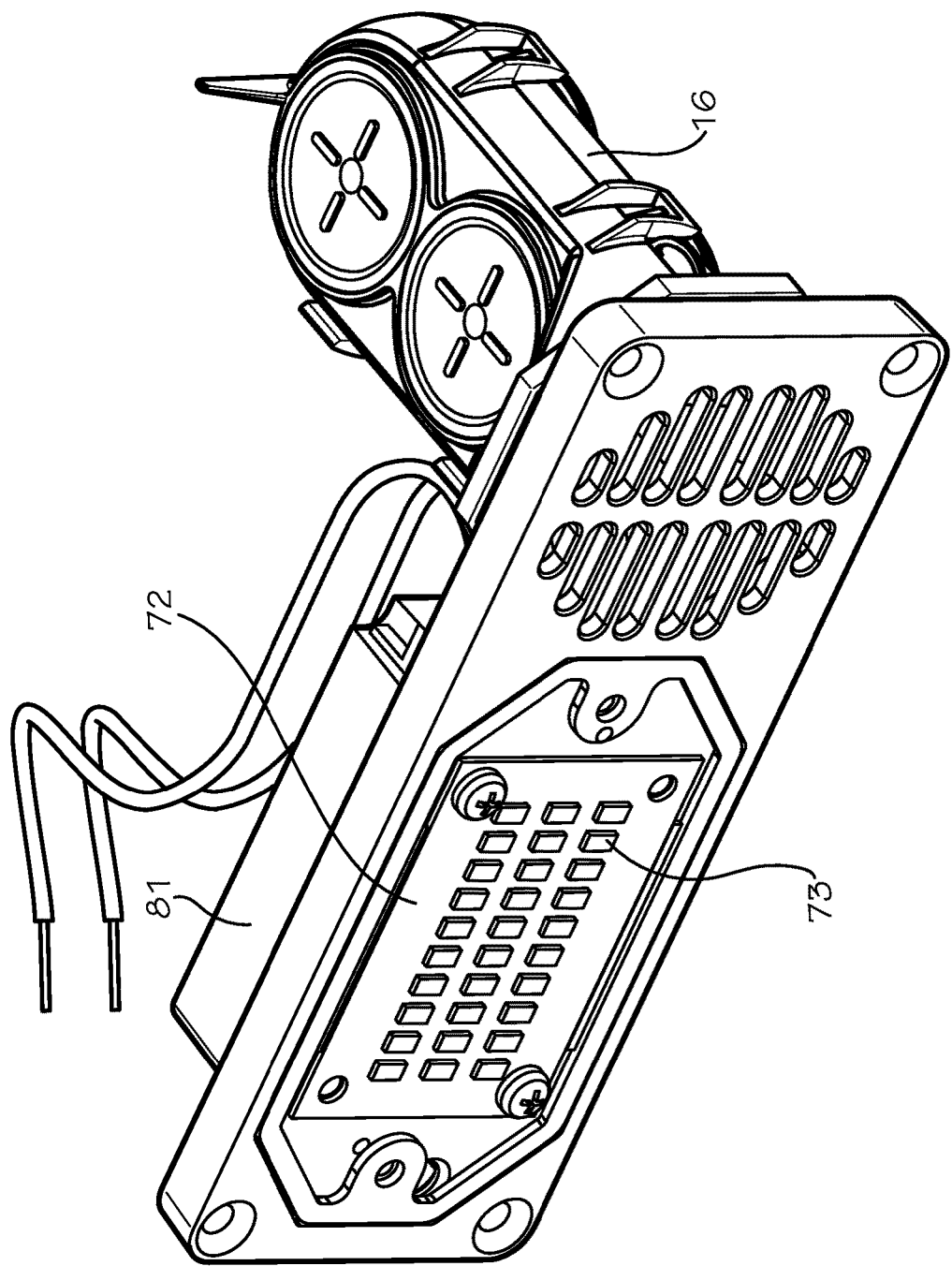
FIG. 2 is a perspective view of a portion of the cold room vent and light of FIG. 1.

With reference next to the drawings, there is shown a combination light and pressure relief ventilator or vent 10 in a preferred form of the invention, referred to hereinafter simply as vent. The vent 10 is used with a temperature controlled enclosure, such as a freezer, refrigerator or other cold room, all of which are referred collectively herein as cold room.

The vent 10 includes a mount or housing 11, a valve assembly 12, and a light assembly 13. The housing 11 includes a thermal valve body 16, a port tube 17, and an outside louver 18. The housing 11 is typically mounted to the wall of the cold room with the port tube 17 mounted to the inside surface of the wall and the outside louver 18 mounted to the outside surface of the wall. The port tube 17 has a top wall 19 and a bottom wall 20. The housing 11 is typically made of a plastic material or the like.

The housing port tube 17 includes a generally cylindrical portion 21 adjacent to a generally rectangular portion 22. The port tube 17 also has an ancillary electrical conduit portion 23 adjacent the rectangular portion 22. The port tube 17 also has an outwardly extending peripheral mounting flange 25 having four mounting holes 26 therethrough which receive mounting screws. The cylindrical portion 21 has a first opening 28 which includes an octangular receiver 29, and a second opening 31 oppositely disposed from the first opening 28 to form a channel 32 therebetween. The cylindrical portion 21 is configured to telescopically house or receive the valve assembly 12 within the channel 32, as described in more detail hereinafter.

The valve body 16 has a central tube portion 34 having an air passage opening 35 surrounded by an outwardly extending, octangular, peripheral mounting flange 36 sized and shaped to removably nest within and in register with the octangular receiver 29 of the housing cylindrical portion 21 in several orientations as described in more detail hereinafter. The valve body 16 defines an interior heat chamber 37 therein. The valve body 16 has a top wall with a first low positive pressure exhaust port 40 therethrough, and a second high positive pressure exhaust port 41 therethrough. The first low positive pressure exhaust port 40 is the same size and shape or configuration as the second high positive pressure exhaust port 41. The valve body 16 also has a bottom wall 43 with a first low negative pressure intake port 44 therethrough, and a second high negative pressure intake port 45 therethrough. The first low negative pressure intake port 44 is the same size and shape or configuration as the second high negative pressure intake port 45. Each port 40, 41, 44 and 45 has a central bar 47 with a valve mounting hole 48 therein. The top wall 39 is removably coupled to the bottom wall 43 and secured thereto through manually actuated clasps or clamps 50, for ease of opening and disassembling the valve assembly 12.

The outside louver 18 has an outwardly extending mounting flange 52 with mounting holes 53 therein through which mounting screws extend to couple the louver 18 to the outside surface of the cold room. The louver 18 includes a drip deflecting hood 54 and a screen 55 therein to prevent the entrance of dirt, foreign object, insects or other pests.

The valve assembly 12 is coupled to and may be considered to be a portion of the valve body 16. The valve assembly 12 includes a first low positive pressure exhaust valve 57 having a mounting stem 58 extending through the valve mounting hole 48 of the first low positive pressure exhaust port 40, a second high positive pressure exhaust valve 59 having a mounting stem 58 extending through the valve mounting hole 48 of the second high positive pressure exhaust port 41, a first low negative pressure intake valve 61 having a mounting stem 58 extending through the valve mounting hole 48 of the first low negative pressure intake port 44, and a second high negative pressure intake valve 62 having a mounting stem 58 extending through the valve mounting hole 48 of the second high negative pressure intake port 45. Valves 57, 59, 61 and 62 are all considered to be air flow control valves and all include, in addition to the stem, a conventional configuration with a head. The end of the stem of each valve 57, 59, 61 and 62 is coupled to one or more circular weights 64 through a mounting screw 65 which gravitationally bias each valve towards a closed position. The weight or mass of each weight 64 determines the pressure necessary to move the valve 57, 59, 61 and 62 from a closed position to an open position, illustrated by the comparison of open positioned valve 57 in FIG. 5 and closed positioned valve 57 in FIG. 6. Each combination valve, valve mounting stem, weight and seat should be consider a valve assembly or valve sub-assembly. As used herein, the terms gravity biased, gravity actuated, gravitationally, gravitationally biased, or the like is intended to denote the biasing force, actuation, or movement of a valve which is generally dependent upon weight to reset the valve to a closed position, as opposed to a spring loaded valve which uses a spring biasing force to reset the valve to a closed position.

The difference in the mass or weight of the weights 64 allows the valves 57, 59, 61 and 62 to be the same construction, size, shape or configuration to aid in manufacturing, inventory and installation, yet allows for different opening pressures for each, i.e., first low positive pressure exhaust valve 57 and first low negative pressure exhaust valve 61 open first due to the biasing weight being less than that of the second high positive pressure exhaust valve 59 and second high negative pressure exhaust valve 62, depending upon whether there is a positive or negative pressure change within the cold room.

The light assembly 13 includes a rectangular shaped LED heat sink plate or casing 68 which is configured to telescopically fit within the mounting flange 25 of the valve body 16, so as to enclose and thereby form the heat chamber 37 through the combination of the casing 38, port tube 17 and valve body 16. The casing 68 is preferably made of a high thermally conductive metal, such as aluminum. The casing 68 is maintained in position by casing mounting screws 69 passing through mounting holes 70. The casing 68 has an exterior front wall or surface 71, to which is mounted an LED module 72 containing a plurality of LED diodes 73. The front wall or surface 71 includes air passages, vent openings, or vents 74 therethrough. A gasket 75 is position between the casing 68 and the front surface port tube 17. A transparent or translucent lens or lens cover 77 is coupled to the front surface 71 of the casing to cover the LED module 72 through lens cover mounting screws 78. A lens gasket 79 is positioned between the lens cover 77 and the front surface 71. An LED driver 81 is electrically coupled to the LED module 72. The LED driver 81 is positioned within the housing rectangular portion 22 and coupled to a source of electric current, such as a conventional A.C. line.

Figure 3:
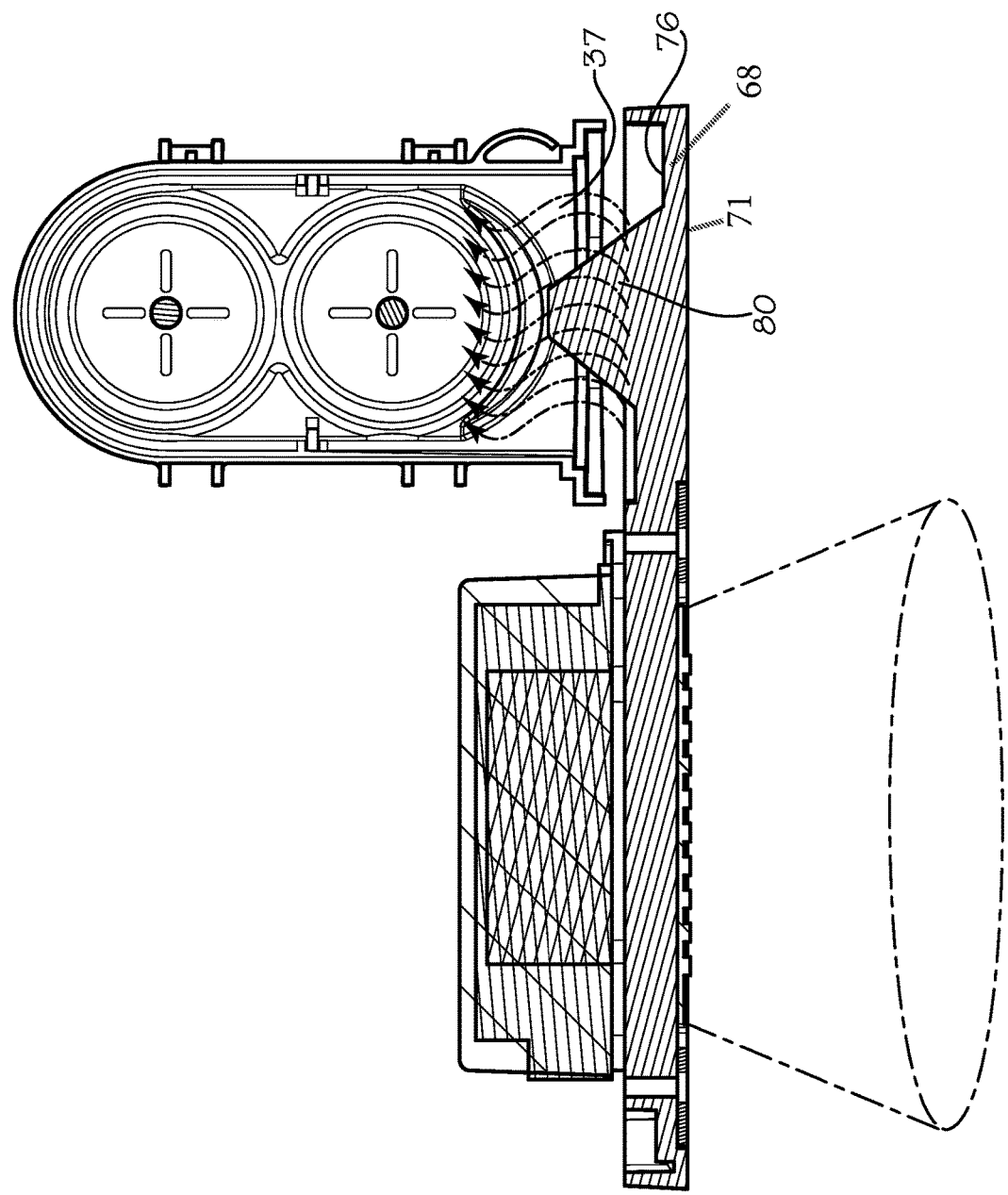
FIG. 3 is a top, cross-sectional view of the cold room vent and light of FIG. 1.
Figure 4:
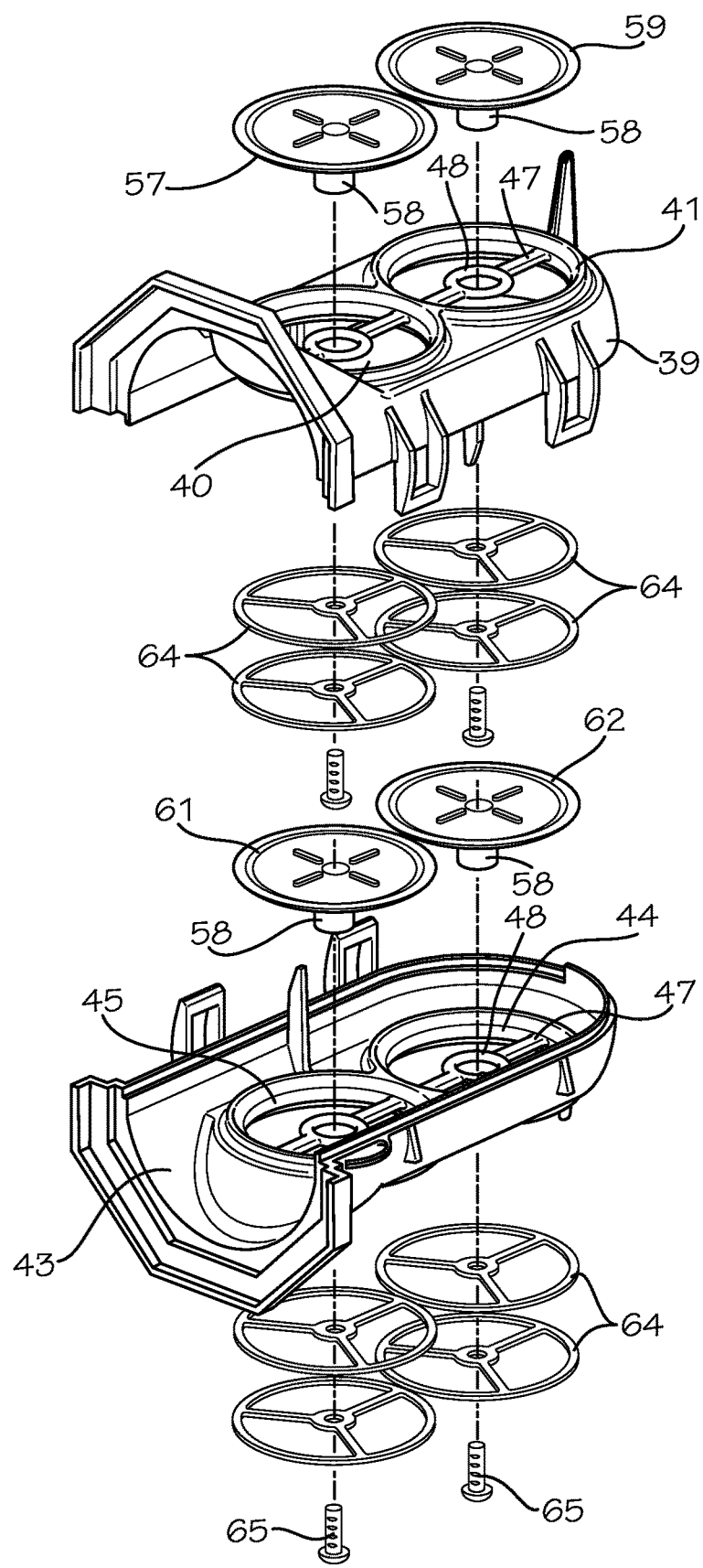
FIG. 4 is an exploded, perspective view of a portion of the cold room vent and light of FIG. 1.

The heat sink casing 68 also includes an interior or rear surface 76 opposite from the front surface 71. The rear surface 76 has a large, trapezoidal or pyramid-shaped projection or projecting portion 80 which extends from between two adjacent vent openings 74 and through air passage opening 35 and at least partially into the heat chamber 37, as specifically into the valve body 16, as shown in FIG. 3. The projecting portion 80 extends or tapers down from the heat sink casing 68 from the rear surface between two adjacent vent openings 74 to a position distal the heat sink casing 68, so that airflow through the vent openings is directed onto the projecting portion 80.

An electrical cover plate 83 is coupled to and encloses the electrical conduit portion 23 of the port tube 17 with a gasket 84 positioned therebetween. The cover plate 83 is maintained in position by mounting screws 85. The cover plate 83 includes two conduit openings 86 which are fitted with removable plugs 87.

In use, the vent 10 is mounted to the wall of a cold room with the port tube 17 mounted to the interior surface and the outside louver 18 mounted to the exterior surface of the cold room wall. The vent 10 allows for a flow of air both into and out of the cold room to ambience through dual stage venting of pressure changes within the cold room. Should the cold room door be opened and a small amount of air is introduced into the cold room (small volume) and subsequently condense to create a negative pressure, the first low negative pressure intake valve 61 overcomes the gravitational biasing force of its weights 64 to move to an open position (as shown by the valve position in FIG. 6) allowing air through the first low negative pressure intake port 44, through valve body opening 35, and through casing air passages 74 into the cold room. Thus, the opening of the first low negative pressure intake valve 61 allows the entrance, flow, or passage of a small volume of air into the cold room to offset the condensing of the small volume of warm air which creates a negative pressure. The first low negative pressure intake valve 61 commences opening at a negative pressure level of at least or approximately 0.3 inches of water. The valve allows a flow rate of 2.5 CFM at 0.3 inches of water.

Figure 6:
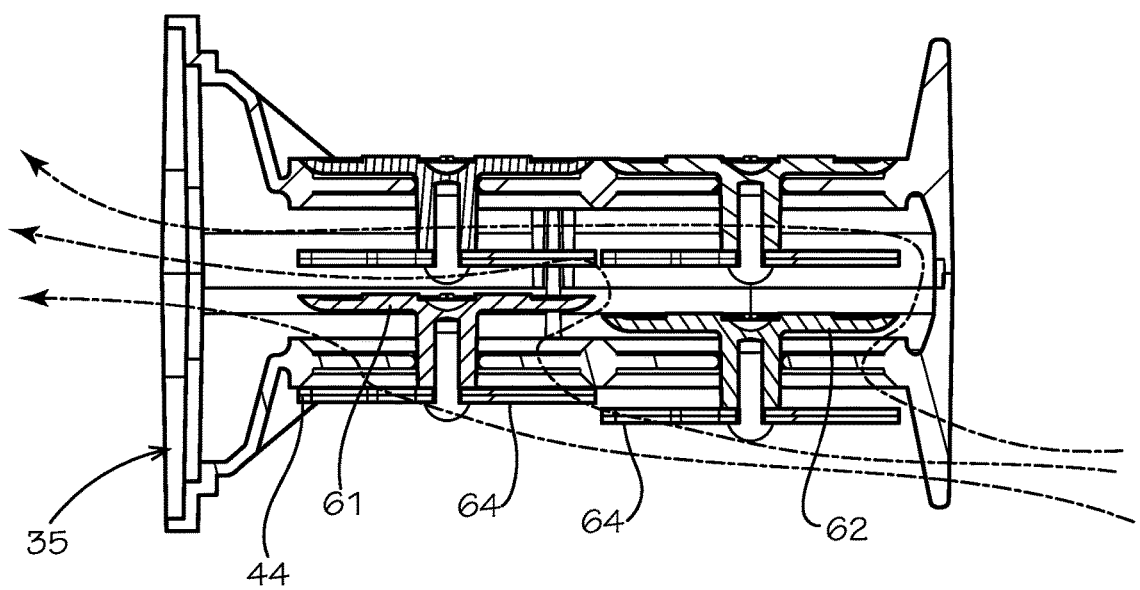
FIG. 6 is a cross-sectional view of a portion of the cold room vent and light of FIG. 1, shown venting negative pressurization of a cold room.

Should the cold room door be opened and a large amount of air is introduced into the cold room (high volume), both the first low negative pressure intake valve 61 and the second high negative pressure intake valve 62 sequentially overcome the biasing forces of their weights 64 to each move to their open positions allowing the flow of air therethrough and subsequently through valve body opening 35 and casing air passages 74, as shown by the arrows in FIG. 6. The opening of both the first low negative pressure intake valve 61 and the second high negative pressure intake valve 62 allows the entrance or passage of a large volume of air into the cold room in a very fast manner to offset the condensing of the large volume of warm air which creates a large negative pressure. The second high negative pressure intake valve 62 may be thought of as a second stage valve when a large amount of air is needed to be taken in to relieve the pressure within the cold room. The process commences with the first low negative pressure intake valve 61 opening as previously described. With the high volume of air, the second high negative pressure intake valve 62 then commences opening at a negative pressure level of at least or approximately 0.8 inches of water. The second high negative pressure intake valve 62 allows a flow rate of 18 CFM at 0.8 inches of water. The quick equalization of the pressure through the opening of both intake valves 61 and 62 prevents the cold room door from being stuck closed due to a large negative pressure within the cold room, which minimizes the potential of one panicking due to the inability to temporarily open the door.

As the room equalizes from the experience of the high negative pressure, the second high negative pressure intake valve 62 will first return to its seated position once the air pressure returns to a level below approximately 0.8 inches of water. The air pressure within the cold room continues to rise by air passing through the first low negative pressure intake valve 61 until the pressure reaches approximately 0.3 inches of water, wherein the first low negative pressure intake valve 61 will also move to its closed position. The end results is a cold room which is generally at a neutral pressure after the entrance of a large volume of warm air and its subsequent condensing upon cooling.

Figure 5:
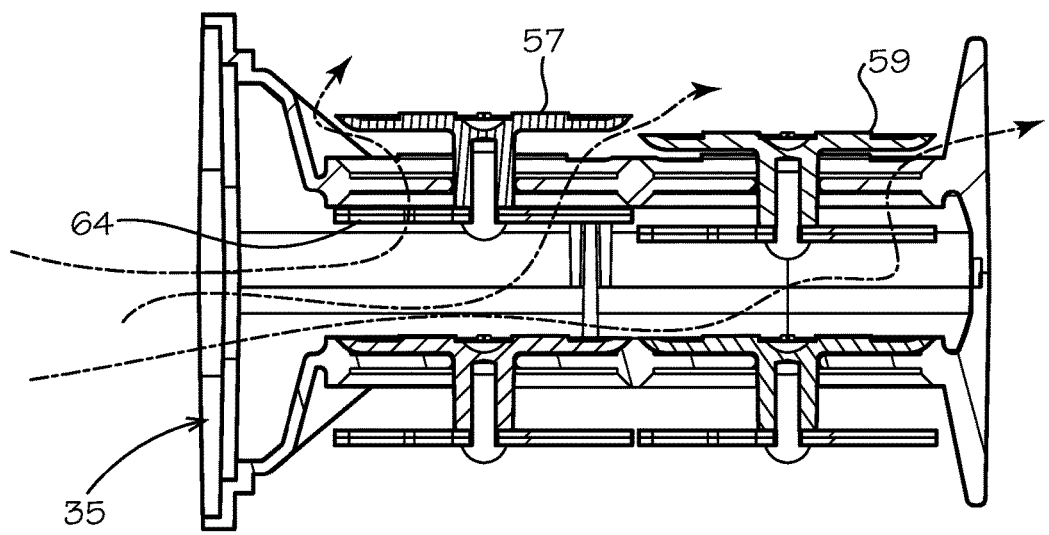
FIG. 5 is a cross-sectional view of a portion of the cold room vent and light of FIG. 1, shown venting positive pressurization of a cold room.

When a positive pressure occurs within the cold room, the first low positive pressure exhaust valve 57 overcomes the biasing force of its weights 64 when a small amount of positive pressure exists within the cold room (as shown by the valve position in FIG. 5). The first low positive pressure exhaust valve 57 opens at a positive pressure level of at least or approximately 0.3 inches of water. The first low positive pressure exhaust valve 57 allows a flow rate of 2.5 CFM at 0.3 inches of water. The cold room may experience positive pressure when one slams a door shut or when the air therein warms, such as when the cold room is going through a defrost mode. This positive pressure may prevent the full closing of the refrigerator door.

Should the cold room door be slammed or defrost mode activated so as to create a large positive pressure within the cold room (high volume), both the first low positive pressure exhaust valve 57 and the second high positive pressure exhaust valve 59 sequentially overcome the biasing forces of their weights 64 to each move to their open positions allowing the flow of air through casing air passages 74, valve body opening 35, exhaust valves and out louver 18, as shown by the arrows in FIG. 5. The opening of both the first low positive pressure exhaust valve 57 and the second high positive pressure exhaust valve 59 allows the exit or exhausting of a large volume of air from the cold room in a very fast manner to offset the introduction or expansion of the large volume of air which creates a large positive pressure. The second high positive pressure exhaust valve 59 may be thought of as a second stage valve when a large amount of air is needed to be exhausted relieve the positive pressure within the cold room. The process commences with the first low positive pressure exhaust valve 57 opening as previously described. With the high volume of air, the second high positive pressure exhaust valve 59 then commences opening at a positive pressure level of at least or approximately 0.8 inches of water. The second high positive pressure exhaust valve 59 allows a flow rate of 18 CFM at 0.8 inches of water. The quick equalization of the pressure through the opening of both exhaust valves 57 and 59 allows the cold room door to close properly by eliminating the positive pressure within the cold room.

As the room equalizes from the experience of the high positive pressure, the second high positive pressure exhaust valve 62 will first return to its seated position once the air pressure returns to a level of approximately 0.8 inches of water. The air pressure within the cold room continues to drop by air passing through the first low positive pressure exhaust valve 57 until the pressure reaches approximately 0.3 inches of water wherein the first low positive pressure exhaust valve 57 will also move to its closed position. The end results is a cold room which is generally at a neutral pressure after the entrance of a large volume of air or expansion of air within the cold room.

Thus, the flow or venting of air into the cold room is controlled by at least two negative pressure intake valves while the flow of air out of the cold room is controlled by two positive pressure exhaust valves.

The vent is preferably designed so that the LED module 72 is always energized to provide constant light within the cold room. The use of LED lights facilitates this due to their low power consumption. The heat generated by the constantly illuminated LED module 72 thermally passes through the heat sink casing 68, i.e., the LED module is in thermal communication with the LED heat sink casing 68. This heating of the LED heat sink casing 68 constantly warms the air within the interior heat chamber 37 of the port tube 17, and specifically within the valve body 16, and thus warms the exhaust valves 57 and 59 and intake valves 61 and 62. The warming of the valves prevents the formation of ice upon the valves which would prevent them from properly opening or closing, i.e., prevents the valves from freezing in place within their respective ports. It should be noted that this heating is economical as the cold room should be constantly illuminated regardless.

The projecting portion 80 extends into the interior heat chamber 37 and specifically into the valve body 16 through valve body opening 35 to warm the air to a higher degree, as the air passes over a larger warmed surface area of the heat sink casing 68.

The octangular shape of the valve body mounting flange allows the valve body 16 to be positioned or repositioned within the octangular receiver 29 in any of the eight positions in which the mounting flange 36 fits or is register within the receiver 29. This flexibility in mounting the valve body 16 relative to the port tube 17 allows the port tube 17 to be mounted in a variety of positions while still allowing the valve assembly 12 to properly gravitationally actuate by positioning the valve body 16 in a horizontal position depicted in the drawings. For example, the port tube 17 may be positioned horizontally with the top wall 19 facing upwardly as shown in the drawings. Alternatively, the port tube 17 may be positioned horizontally with the top wall 19 facing downwardly (inverted from the depiction in the drawings). Alternatively, the port tube 17 may be positioned vertically with the top wall 19 oriented vertically and facing to the right (turned 90 degrees counterclockwise from the depiction in the drawings). Alternatively, the port tube 17 may be positioned vertically with the top wall 19 oriented vertically and facing to the left (turned 90 degrees clockwise from the depiction in the drawings). Also, the port tube 17 or may be positioned to any of the four positioned between these horizontal or vertical positions (turned at 45 degree angles from the just described four positions). With each of the eight positions the port tube mounting, flange 36 is still positioned to be nested within the octangular receiver 29 with the valve body 16 oriented horizontally, as depicted in the drawings, so that the gravitational valves are still oriented vertically for proper actuation upon a change in air pressure. It should be understood that other shapes of flanges and receivers may also be designed which may provide more or less varied positions. For example, a square flange and receiver would provide four orientations for the mounting of the port tube 17 and consequently relative mounting positions of the valve body 16.

The first low positive pressure exhaust valve 57, the second high positive pressure exhaust valve 59, the first low negative pressure intake valve 61, and the second high negative pressure intake valve 62 all have the same size and shape or configuration so that any valve may be fitted to any related port 40, 41, 44 and 45. This reduces inventory needs, reduces the cost of manufacturing, and eases the maintenance of the vent 10.

It should be understood that the combination of a light and vent also reduces cost and labor as both features are achieved through the mounting of a single unit which includes both functions.

It should also be understood that the light assembly is considered to be a heat assembly, as the light assembly creates heat. However, as an alternative to the LED light source shown in the preferred embodiment, the vent may include other types of commonly known heat assemblies, such as an electrically resistive element or non-LED light sources.

It should be understood that the projection 80 and the removable feature of the valve body with the receiver 29 and flange 36 of the present invention may be used with non-gravitational actuated valves.

It thus is seen that a vent is now provided which avoids the formation of ice on the vent valves and allows for both small and large amounts of air venting. Though it has been described in detail in its preferred form, it should be realized that many modifications, additions and deletions may be made without departure from the spirit and scope of the invention as set forth in the following claims.

The invention claimed is:

1. A cold room vent comprising: a main housing mountable to a cold room structure;
   a valve housing coupled to said main housing, said valve housing defining an interior heat chamber;
   a valve assembly coupled to said valve housing, and wherein said valve assembly includes a gravity biased first pressure intake valve having a first weight which allows the opening of said gravity biased first pressure intake valve at a first air pressure level, and a gravity biased second pressure intake valve having a second weight which allows the opening of said gravity biased second pressure intake valve at a second air pressure level greater than said first air pressure level;
   a light assembly coupled to said valve housing, said light assembly having thermally conductive heat sink plate with an external surface and an internal surface in fluid communication with said interior heat chamber, said internal surface having an outwardly extending projection extending into said interior heat chamber, said light assembly also including a light source coupled to and in thermal communication with said exterior surface of said thermally conductive heat sink plate,
   whereby heat generated by the light source is thermally conducted to the thermally conductive heat sink plate wherein the projection provides a surface area to transfer the heat to the interior heat chamber to warm the valve assembly.

2. The cold room vent of claim 1 wherein said heat sink plate includes at least one vent opening extending from said external surface to said internal surface positioned directly adjacent said projection.

3. The cold room vent of claim 1 wherein said projection tapers down from a position proximal said internal surface to a position distal said internal surface.

4. The cold room vent of claim 1 wherein said projection is trapezoidal in shape.

5. The cold room vent of claim 1 wherein said valve assembly further comprises a gravity biased first pressure exhaust valve having a first weight which allows the opening of said gravity biased first pressure exhaust valve at a first air pressure level, and a gravity biased second pressure exhaust valve having a second weight which allows the opening of said gravity biased second pressure exhaust valve at a second air pressure level greater than said first air pressure level.

6. A cold room vent comprising: a mount mountable to a cold room structure;
   a valve body coupled to said mount, said valve body defining a heat chamber having an air passage entrance opening;
   at least one valve coupled to said valve body;
   wherein said at least one valve includes a gravity biased first pressure intake valve having a first weight which allows the opening of said gravity biased first pressure intake valve at a first air pressure level, and a gravity biased second pressure intake valve having a second weight which allows the opening of said gravity biased second pressure intake valve at a second air pressure level greater than said first air pressure level;
   a thermally conductive heat sink plate mounted closely adjacent said valve body, said heat sink plate having a front surface and a rear surface facing said valve body, said rear surface having a projection extending through said air passage entrance and into said heat chamber, and
   a light source coupled to and in thermal communication with said heat sink plate,
   whereby heat generated by the light source is thermally conducted to the thermally conductive heat sink plate wherein the projection transfers heat to the heat chamber to warm the at least one valve.

7. The cold room vent of claim 6 wherein said heat sink plate includes at least one vent opening extending through said heat sink plate and positioned directly adjacent said projection.

8. The cold room vent of claim 6 wherein said projection tapers down from a position proximal said rear surface to a position distal said rear surface.

9. The cold room vent of claim 6 wherein said projection is trapezoidal in shape.

10. The cold room vent of claim 6 wherein said at least one valve further comprises a gravity biased first pressure exhaust valve having a first weight which allows the opening of said gravity biased first pressure exhaust valve at a first air pressure level, and a gravity biased second pressure exhaust valve having a second weight which allows the opening of said gravity biased second pressure exhaust valve at a second air pressure level greater than said first air pressure level.

11. A cold room vent comprising:
    a mount mountable to a cold room structure;
    a valve housing coupled to said mount, said valve housing defining a heat chamber having an air passage entrance opening;
    at least one valve coupled to said valve housing;
    wherein said at least one valve includes a gravity biased first pressure intake valve having a first weight which allows the opening of said gravity biased first pressure intake valve at a first air pressure level, and a gravity biased second pressure intake valve having a second weight which allows the opening of said gravity biased second pressure intake valve at a second air pressure level greater than said first air pressure level;
    a thermally conductive heat sink plate mounted closely adjacent said valve housing air passage entrance opening, said heat sink plate having a front surface and a rear surface facing said valve housing, said heat sink plate having a plurality of vent openings therethrough, said heat sink plate also having a projection extending from said rear surface between two said vents of said plurality of vents and into said heat chamber, and a heat source coupled to and in thermal communication with said heat sink plate, whereby heat generated by the heat source is thermally conducted to the thermally conductive heat sink plate wherein the projection transfers heat to the heat chamber to warm the at least one valve.

12. The cold room vent of claim 11 wherein said projection tapers down from a position proximal said rear surface to a position distal said rear surface.

13. The cold room vent of claim 11 wherein said projection is trapezoidal in shape.

14. The cold room vent of claim 11 wherein said at least one valve further comprises a gravity biased first pressure exhaust valve having a first weight which allows the opening of said gravity biased first pressure exhaust valve at a first air pressure level, and a gravity biased second pressure exhaust valve having a second weight which allows the opening of said gravity biased second pressure exhaust valve at a second air pressure level greater than said first air pressure level.

15. The cold room vent of claim 11 wherein said heat source is a light source.

16. The cold room vent of claim 15 wherein said light source is an LED light source.

* * * * *